(12) United States Patent
Yu et al.

(10) Patent No.: US 8,299,780 B2
(45) Date of Patent: Oct. 30, 2012

(54) HAND AND PRESS-BUTTON DUAL-WAY MANUAL PULSE GENERATOR WITH BUILT-IN INDICATOR LAMPS

(75) Inventors: Dehai Yu, Dalian (CN); Xingjia He, Dalian (CN); Fuzheng Sun, Dalian (CN); Hongqi Chen, Dalian (CN); Xicai Liu, Dalian (CN); Defeng Gao, Dalian (CN)

(73) Assignee: Dalian Guangyang Science & Technology Engineering Co., Ltd., Dalian (CN)

( * ) Notice: Subject to any disclaimer, the term of this patent is extended or adjusted under 35 U.S.C. 154(b) by 675 days.

(21) Appl. No.: 12/522,536

(22) PCT Filed: Nov. 12, 2007

(86) PCT No.: PCT/CN2007/003185
§ 371 (c)(1),
(2), (4) Date: Jul. 8, 2009

(87) PCT Pub. No.: WO2008/086679
PCT Pub. Date: Jul. 24, 2008

(65) Prior Publication Data
US 2010/0033168 A1 Feb. 11, 2010

(51) Int. Cl.
*G01B 7/14* (2006.01)
(52) U.S. Cl. .................................. 324/207.13
(58) Field of Classification Search .............. 324/207.13
See application file for complete search history.

(56) References Cited

U.S. PATENT DOCUMENTS

| 5,029,329 A | 7/1991 | Miyajima et al. |
| 5,621,317 A * | 4/1997 | Wozniak ................. 324/207.13 |

FOREIGN PATENT DOCUMENTS

| CN | 1102880 A | 5/1995 |
| CN | 1200318 A | 12/1998 |
| CN | 2548752 Y | 5/2003 |
| CN | 2814523 Y | 9/2006 |
| JP | 9-201745 | 8/1997 |
| JP | 2000-137513 | 5/2000 |

* cited by examiner

*Primary Examiner* — Reena Aurora
(74) *Attorney, Agent, or Firm* — Squire Sanders (US) LLP (57) ABSTRACT

The present invention discloses a hand and press-button dual-way manual pulse generator with built-in indicator lamps, which comprises a rotation pulse input unit and a CPU. The CPU is connected with a forward rotation indicator lamp and an inverse rotation indicator lamp. The rotation signal input unit and/or the press-button signal input unit transmit the output signal to the CPU. The rotation pulse input unit transmits the output signal to the CPU where the output signal is processed and the control signal is then output through the difference chip. Meanwhile, the CPU collects control signals through the feedback circuit to realize self-check when the machine is turned on. The pulse generator has a non-contact structure extending significantly its service life than the prior art, which makes it durable. In addition, by installing a controller, built-in indicator lamps, and press-button control on the manual pulse generator, it offsets the technical defects of the current manual pulse generator, reduces the fault incidence, and greatly enhances work efficiency. Besides, the manual pulse generator has a simple structure that it is easy to manufacture and to widely spread in the field of the machine tool control.

18 Claims, 5 Drawing Sheets

Figure 1

(Prior art)

HAND AND PRESS-BUTTON DUAL-WAY MANUAL PULSE GENERATOR WITH BUILT-IN INDICATOR LAMPS

FIELD OF THE INVENTION

The present invention relates to a pulse generator for realizing the movement and the positioning of a cutter, a workpiece or a similar device on a machine tool in the numerical control field, particularly to a manual pulse generator having built-in indicator lamps and functional press-buttons and having the function of self-check when turning on.

DESCRIPTION OF THE RELATED ART

The manual pulse generator is a device used on a machine tool to realize that a cutter, a workpiece or a similar device moves and is positioned on a machine tool accurately, and the device is widely used in the numerical control field at present. The manual pulse generator outputs a pulse by manually rotating a cranking bar, a pulse is output when the cranking bar rotates a graduation, and the movement distance of the cutter or the workpiece is in direct proportion to the number of the output pulses. When rotating, the manual pulse generator can output a pulse. (When rotating forward, the manual pulse generator outputs the forward pulse; when rotating reversely, the manual pulse generator outputs the inverse pulse.)

Figure 1:
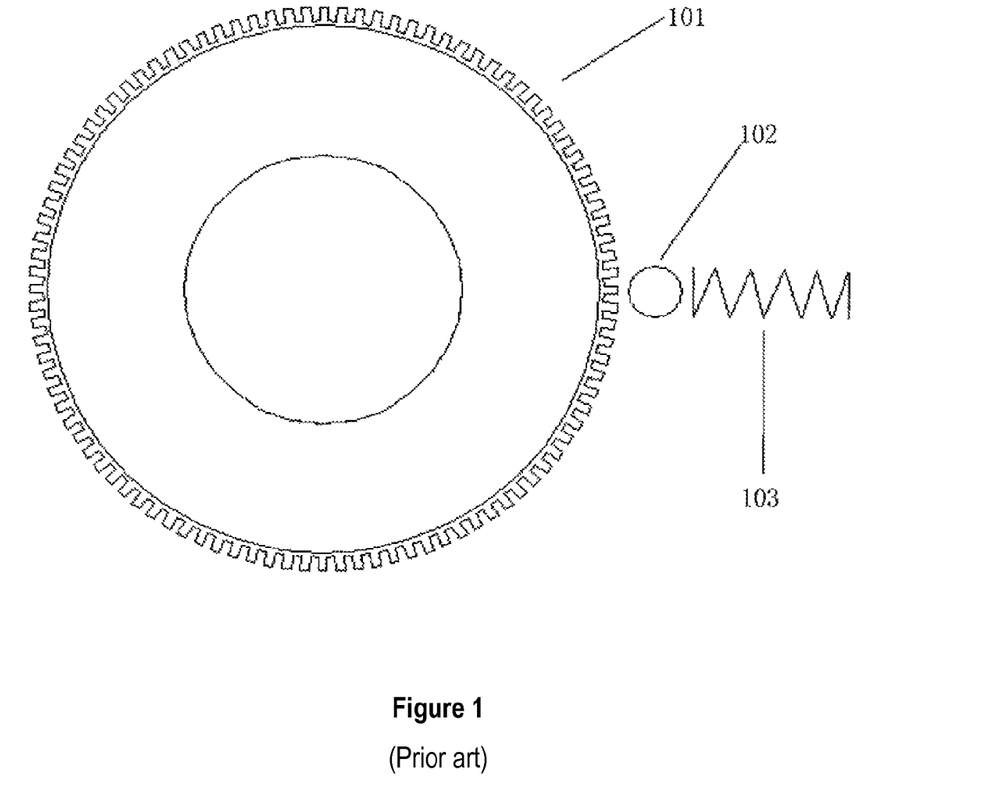
FIG. 1 the structural representation of the spring damping principle for the rotation input disk of the prior art.

The previous manual pulse generator has the problem that in the state of fine adjustment, the rotating shaft is under the state of free rotation without damping, users can not perceive the input angle, and therefore, the input angle is not easy to control when operators rotate the manual pulse generator. As a result, the advanced method at present is as follows: an intermediate device for making the users perceive the fine adjustment input of angles is shown in FIG. 1, and comprises a rotating disk (101) provided with teeth, which is connected with and synchronously rotates with the rotating shaft, and a spring (103) causes a rotary small shaft (102) to lean against the teeth of the rotating disk (101). In the rotating process of the rotating disk (101), the small shaft (102) rotates from the tooth valley to the tooth peak or from the tooth peak to the tooth valley for causing the change of the shrinkage mass of the spring to generate elastic damping so as to obstruct rotation, thereby making the users obtain the stepping sense in the process of rotating the cranking bar; in this way, because of the function of the elastic damping of the spring (103), when rotating the pulse generator, the users can perceive the graduation which the pulse generator rotates, and further, the number of the output pulses is known. However, the total contact mechanical structure appears, and consequently, the service life of the generator is influenced due to the abrasion.

In addition, the traditional manual pulse generators have no indication function; when rotating the manual pulse generator, operators usually can not know whether pulses are output and the number of the output pulses is consistent with the graduation which the generator rotates; in this way, misoperation is easy to cause, and more seriously, the cutter can be broken, resulting in great damage; and meanwhile, the use of the machine tool is influenced, and consequently, the work efficiency is reduced. The distance which the cutter and the workpiece move is in direct proportion to the number of the output pulses; the longer distance the cutter or the workpiece moves, the more circle number the manual pulse generator rotates by swinging; and thus, the needed time is longer, and the work efficiency is reduced. When the manual pulse generator of the prior art goes wrong, the generator needs to be connected with the machine tool system for check, and in this way, a problem is caused as follows: when the machine tool goes wrong and the failure occurs under the condition of the manual pulse, maintenance personnel need to check other unrelated components, and repeatedly install the manual pulse generator which goes wrong in the system for determining the problem finally, and consequently, the work efficiency of check and maintenance operation is influenced. Therefore, it is necessary to invent a novel manual pulse generator for solving the defects.

SUMMARY OF THE INVENTION

Aiming at the defects of the prior art, a manual pulse generator having the functions of self-check, indication and fine adjustment state perception is developed. The technical means are as follows:

A manual pulse generator comprising a rotation pulse input unit and a CPU, wherein the rotation pulse input unit transmits output signals to the CPU where the output signals are processed, and then control signals are output by a difference chip; meanwhile, the CPU is also connected with a feedback circuit for collecting the control signals to realize self-check when turning on; the CPU is also connected with a forward rotation indicator lamp and an inverse rotation indicator lamp.

wherein the rotation pulse input unit comprises a manual rotation mechanism, a signal generation mechanism and a magnetic brake mechanism:

wherein the manual rotation mechanism comprises a dial connected with a rotating shaft;

wherein the signal generation mechanism comprises a code disk fixed to and synchronously rotating with the rotating shaft, and a photoelectric switch for monitoring the code disk; the electrical signals generated by the photoelectric switch are transmitted to the CPU;

wherein the magnetic brake mechanism comprises an iron bowl and an outer ring tooth damping fin connected to and synchronously rotating with the dial, and fixed inner ring tooth damping fins arranged in the mode of concentricity with the outer ring tooth damping fins;

wherein the inner ring tooth damping fins and the outer ring tooth damping fins are respectively provided with teeth with middle intervals, mutually corresponding tooth shapes and the same tooth number on the outer circle and the inner circle;

wherein the inner ring tooth damping fins are attached to one side of an annular magnet, and the other side of the annular magnet is connected with the outer ring tooth damping fins by the iron bowl;

wherein the inner ring tooth damping fins and the outer ring tooth damping fins are both made from permeablility magnetic materials, magnetic poles N and S are respectively formed on the teeth of the inner ring tooth damping fins and the outer ring tooth damping fins, and the polarities of the magnetic poles formed on the adjacent positions of the teeth are opposite.

Wherein the forward rotation indicator lamp and the inverse rotation indicator lamp are arranged on a fixed seat.

Wherein the inner ring tooth damping fins and the outer ring tooth damping fins are both formed by stacking a number of damping fins.

A manual pulse generator comprising the rotation pulse input unit, the CPU and a press-button signal input unit, wherein the rotation pulse input unit and the press-button signal input unit transmit the output signals to the CPU where the output signals are processed, and then the control signals are output by the difference chip; meanwhile, the CPU is also connected with the feedback circuit for collecting the control signals to realize self-check when turning on; the CPU is also connected with the forward rotation indicator lamp and the inverse rotation indicator lamp.

wherein the rotation pulse input unit comprises a manual rotation mechanism, a signal generation mechanism and a magnetic brake mechanism:

wherein the manual rotation mechanism comprises a dial connected with a rotating shaft;

wherein the signal generation mechanism comprises a code disk fixed to and synchronously rotating with the rotating shaft, and a photoelectric switch for monitoring the code disk; the electrical signals generated by the photoelectric switch are transmitted to the CPU;

wherein the magnetic brake mechanism comprises an iron bowl and an outer ring tooth damping fin connected to and synchronously rotating with the dial, and fixed inner ring tooth damping fins arranged in the mode of concentricity with the outer ring tooth damping fins;

wherein the inner ring tooth damping fins and the outer ring tooth damping fins are respectively provided with the teeth with middle intervals, mutually corresponding tooth shapes and the same tooth number on the outer circle and the inner circle;

wherein the inner ring tooth damping fins are attached to one side of the annular magnet, and the other side of the annular magnet is connected with the outer ring tooth damping fins by the iron bowl;

wherein the inner ring tooth damping fins and the outer ring tooth damping fins are both made from permeablility magnetic materials, magnetic poles N and S are respectively formed on the teeth of the inner ring tooth damping fins and the outer ring tooth damping fins, and the polarities of the magnetic poles formed on the adjacent positions of the teeth are opposite.

Wherein the inner ring tooth damping fins and the outer ring tooth damping fins are both formed by stacking a number of damping fins.

An operation method for a manual pulse generator comprising the steps of inputting signals to the CPU by a rotation signal input unit, outputting the control signals by the CPU, and also comprising the steps of inputting the signals to the CPU by press-buttons, and finally outputting the control signals by the CPU.

Wherein the step of inputting the signals to the CPU by the press-buttons comprises the steps that a pulse signal is generated in the CPU for realizing the output of the control signals when the press-buttons are pressed for shorter than 0.5 second; a pulse signal output with 10 Hz frequency is generated in the CPU when the press-buttons are pressed for 0.5 second to 2 seconds; a pulse signal output with 100 Hz frequency is generated in the CPU when the press-buttons are pressed for 2 seconds to 5 seconds; and a pulse signal output with 1000 Hz frequency is generated in the CPU when the press-buttons are pressed for longer than 5 seconds.

The operation method for a manual pulse generator also comprising the step that the control signals are fed back to CPU to realizing self-check operation when turning on.

wherein the CPU starts the forward rotation indicator lamp or the inverse rotation indicator lamp for indicating the forward rotation condition or the inverse rotation condition of a motor under the condition of control signal output.

By the technical scheme, zigzag magnetic fields are formed on the outer edge of the inner ring tooth damping fins and the inner edge of the outer ring tooth damping fins, and damping action is formed through the two magnetic fields; the strength of the damping effect can be changed by adjusting the quantity of the inner ring tooth damping fins and the outer ring tooth damping fins, and the more the damping fins are, the stronger the damping effect is; and the fewer the damping fins are, the weaker the damping effect is. As a result, the magnetic damping type manual rotation input disk with teeth has the characteristics of good damping effect, easy perception and good rotation hand feeling; since a non-contact structure is adopted, compared with those of the prior art, the service life is extended greatly, and high durability is obtained.

In addition, the controller and the built-in indicator lamps are installed on the manual pulse generator for offsetting the defects of the manual pulse generator in the prior art, and the manual pulse generator has the self-check function; with the help of the built-in indicator lamps, when turning on the numerical control machine, operators can know whether the manual pulse generator is normal, so that it is easy to eliminate the system fault; by the indicating function of the built-in indicator lamps, the operators can know whether the manual pulse generator has pulse output and the number of the output pulses is consistent with the graduation which the manual pulse generator rotates, so the reliability of the manual pulse generator is enhanced. The present invention adopts two ways of rotation and press-button pressing to input pulses, under the condition that the cutter or the workpiece needs to move longer distance, the press-buttons are only needed for realizing the output of the control signals, but the traditional method that the cranking bar needs to be swung by hundreds of circles with wasting time and effort is abandoned; consequently, the swinging time is reduced greatly, misoperation is avoided, the fault incidence is reduced, and work efficiency is enhanced greatly. Owing to the easy structure, it is easy to produce; and it is suitable for popularization with low cost.

BRIEF DESCRIPTION OF THE FIGURES

FIG. 5 is used in the Abstract of Specification.

In the figures: 3 code disk, 4 photoelectric switch, 5 rotating shaft, 7 circuit board, 8 dial, 9 iron bowl, 10 annular magnet, 11 inner ring tooth damping fins, 12 outer ring tooth damping fins, 14 fixed seat, 16 interval, 18 CPU, 101 rotating disk, 102 small shaft, 103 spring, 111, 112 teeth, 801 forward rotation indicator lamp, 802 inverse rotation indicator lamp, 803 forward rotation press-button, 804 inverse rotation press-button.

DESCRIPTION OF THE PREFERRED EMBODIMENT

Example Embodiment 1

Figure 3:
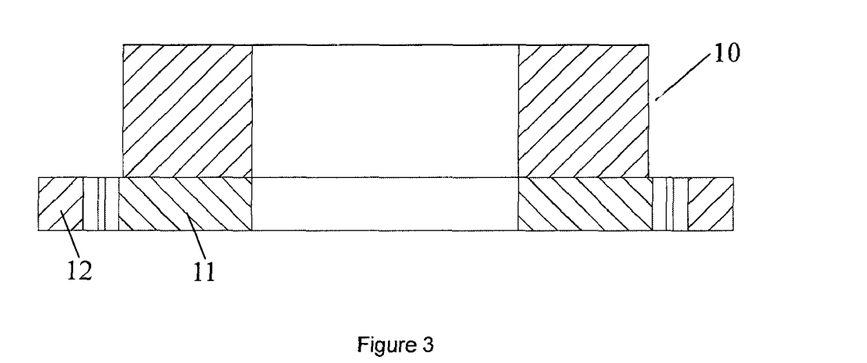
FIG. 3 the profile figure in FIG. 2.
Figure 4:
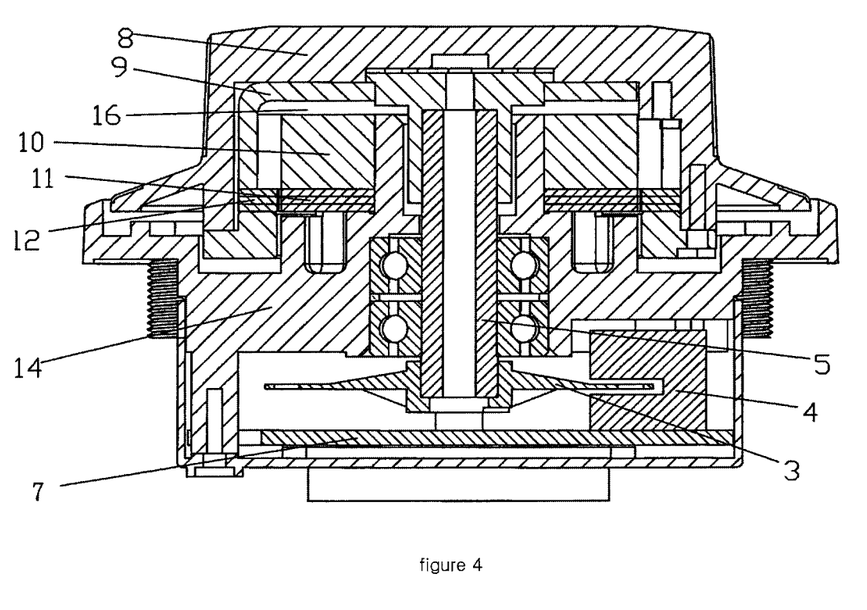
FIG. 4 the mechanical structural representation of the present invention.
Figure 5:
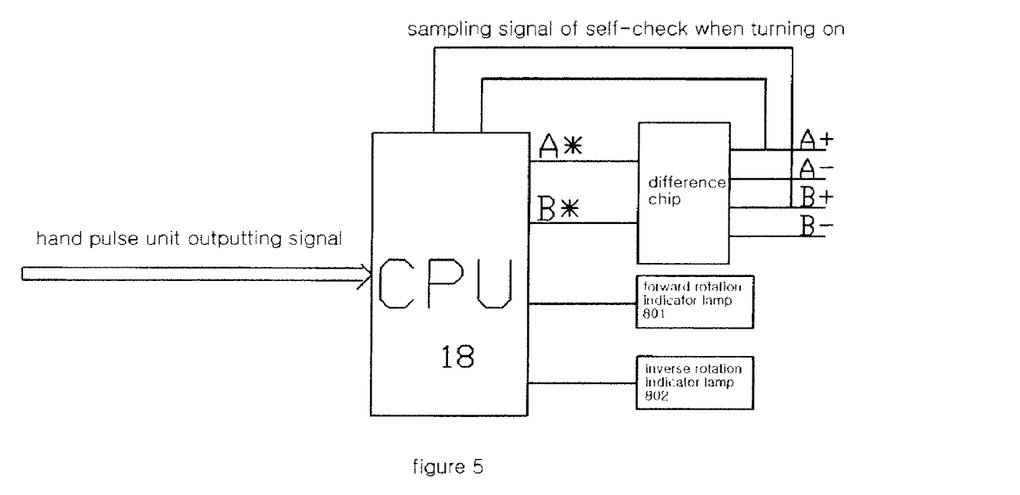
FIG. 5 the schematic circuit diagram of the manual pulse generator with the built-in indicator lamps of the present invention.
Figure 7:
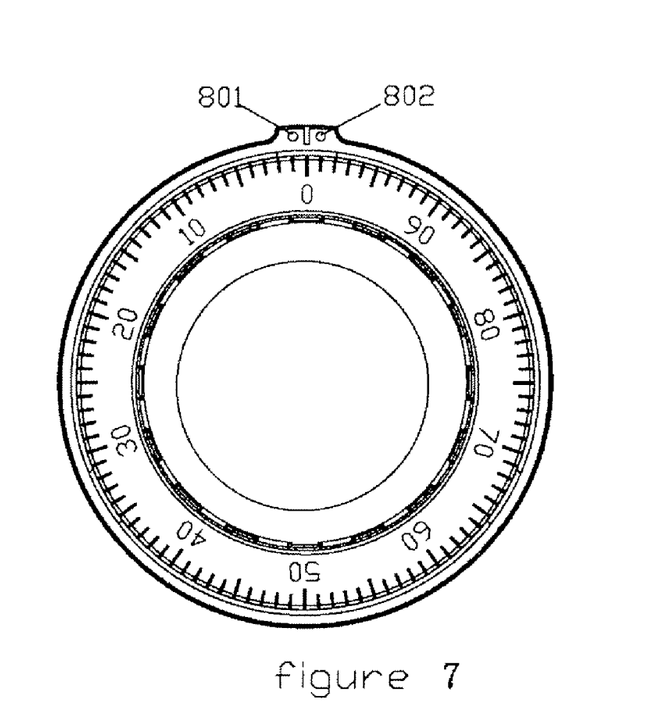
FIG. 7 the panel structural representation of the manual pulse generator with the built-in indicator lamps of the present invention.

As shown in FIG. 2 to FIG. 5, and FIG. 7, the manual pulse generator designed in the present invention is provided with built-in indicator lamps and a self-check circuit, and mainly comprises a rotation pulse input unit and a central processing unit (CPU) 18, wherein the CPU mainly has the functions for converting pulse signals into signals for controlling a machine tool, controlling the built-in indicator lamps, and realizing self-check when turning on. The check circuit, the forward rotation indicator lamp 801 and the inverse rotation indicator lamp 802 are shown in FIG. 7. When the machine is turned on, the check circuit is used for checking whether a manual pulse generator circuit is normal; in the operation stage, the built-in indicator lamps are used for checking whether the manual pulse generator outputs a pulse and whether the output pulse is forward or inverse. The forward rotation indicator lamp is used for indicating that the manual pulse generator outputs a forward pulse, and the inverse rotation indicator lamp is used for indicating that the manual pulse generator outputs an inverse pulse. The forward rotation indicator lamp 801 and the inverse rotation indicator lamp 802 are arranged on the panel of the manual pulse generator of the present invention as shown in FIG. 7, and are connected with the CPU by conducting wires (as shown in FIG. 5).

The signals output by the rotation pulse input unit are transmitted to the CPU 18, and the CPU 18 outputs control signals for realizing the movement or the positioning of a cutter or a workpiece on the machine tool by a difference chip. Under the turn on condition, the control signals are fed back to the CPU 18 by a circuit to realize self-check when turning on. More specifically, the manual pulse generator enters the self-check stage when turned on. As shown in FIG. 7, signals (A+, B+) output by the difference chip are sampled and fed back to the CPU, and then the whole circuit is checked; if the circuit is normal, the forward rotation indicator lamp and the inverse rotation indicator lamp are simultaneously turned on for 1 second; and if the circuit is not normal, the forward rotation indicator lamp and the inverse rotation indicator lamp are both turned off.

To the operation stage after self-check, when the manual pulse generator outputs a forward pulse, the forward rotation indicator lamp flickers, and the inverse rotation indicator lamp is turned off; when the manual pulse generator outputs an inverse pulse, the inverse rotation indicator lamp flickers, and the forward rotation indicator lamp is turned off; and when no pulse is output by the manual pulse generator, the forward rotation indicator lamp and the inverse rotation indicator lamp are both turned off. When the manual pulse generator outputs a pulse with higher frequency, the flicker frequency of the built-in indicator lamps is also higher so that people can not observe that the built-in indicator lamps flicker with the naked eyes, and thus, the built-in indicator lamps flicker with the n crossover frequency (n from natural numbers) of the pulse frequency output by the manual pulse generator when the manual pulse generator outputs a pulse with higher frequency.

Figure 2:
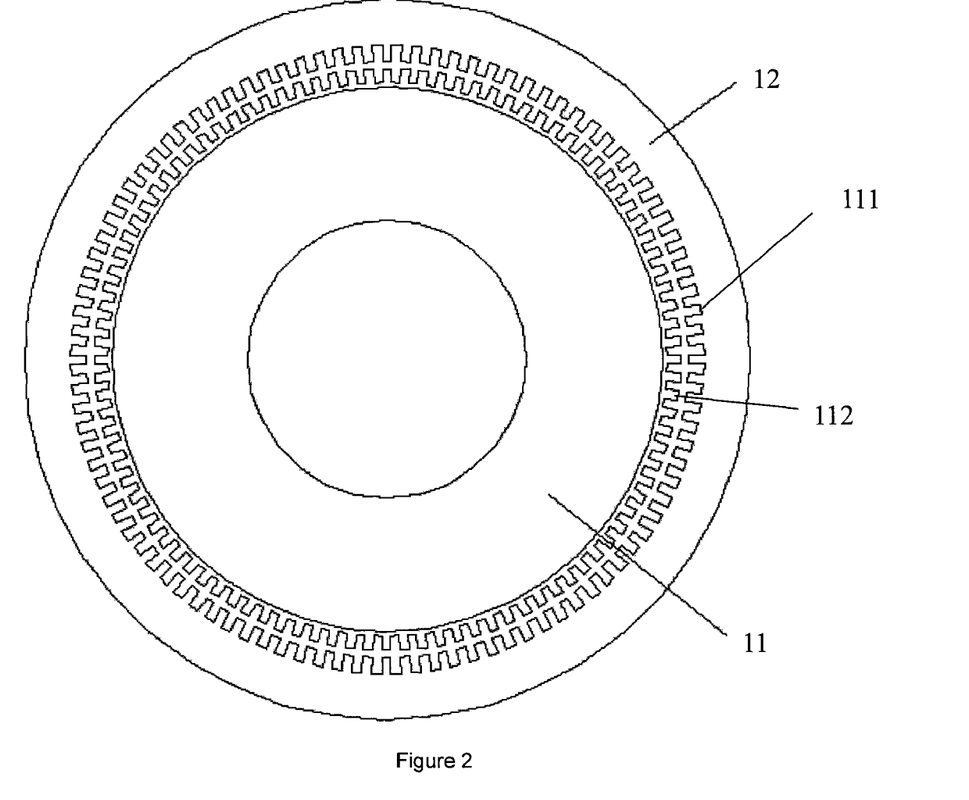
FIG. 2 the structural representation of the magnetic damping principle for the rotation input disk of the present invention.

As shown in FIG. 4, the structure of the rotation unit is introduced by combining the principles of FIG. 2 and FIG. 3, wherein inner ring tooth damping fins 11 and outer ring tooth damping fins 12 formed by stacking permeablility magnetic materials, and an annular magnet 10 are shown, the inner ring tooth damping fins 11 and the outer ring tooth damping fins 12 are arranged in the mode of concentricity, and the inner ring tooth damping fins 11 and the outer ring tooth damping fins 12 are respectively provided with teeth 111, 112 with middle intervals, mutually corresponding tooth shapes and the same tooth number on the outer circle and the inner circle.

A driving dial 8 and a driven rotating shaft 13 are connected, and the outer ring tooth damping fins 12 and an iron bowl 9 are fixed in the dial 8; the iron bowl 9 is mainly used for conducting the magnetic force of the magnet 10 to the outer ring tooth damping fins 12. Although an interval 16 exists between the iron bowl 9 and the magnet 10 in FIG. 4, magnetism conduction can be realized because of the small interval. In addition, the inner ring tooth damping fins 11 and the annular magnet 10 are fixed on a fixed seat 14; thus, magnetic poles N and S are respectively formed on the teeth of the inner ring tooth damping fins 11 and the outer ring tooth damping fins 12, or magnetic poles S and N are respectively formed on the teeth of the inner ring tooth damping fins 11 and the outer ring tooth damping fins 12. When the dial 8 rotates, the outer ring tooth damping fins 12 will rotate in the mode of concentricity with the dial, and the inner ring tooth damping fins 11 and the outer ring tooth damping fins 12 relatively rotate so that people can seem to hear clacker sounds to feel rotation graduations when the rotation is realized by the principle. Additionally, an code disk 3 rotating in the mode of concentricity with a rotating shaft 5, and a photoelectric switch 4 for checking a rotation condition are also shown in FIG. 2. Because uniformly distributed narrow slits are carved in the code disk 3, the photoelectric switch 4 can output desired pulses when the code disk 3 rotates; the number of the output pulses is in direct proportion to the rotation angle of the code disk 3. The electrical signals generated by the photoelectric switch 4 are transmitted to the CPU on a circuit board 7.

For conveniently changing the magnitude of magnetic damping, the inner ring tooth damping fins 11 and the outer ring tooth damping fins 12 are both formed by stacking a plurality of damping fins; the more the damping fins are, the stronger the damping effect is; and the fewer the damping fins are, the weaker the damping effect is. The magnet can be also arranged on both sides of the inner ring tooth damping fins 11 and the outer ring tooth damping fins 12 as long as that corresponding magnetic poles N and S are formed between the teeth of the inner ring tooth damping fins 11 and the outer ring tooth damping fins 12 is guaranteed.

Example Embodiment 2

As shown in FIG. 2 to FIG. 4, FIG. 6 and FIG. 8, the present invention also relates to a rotation and press-button dial-way manual pulse generator which mainly comprises a rotation signal input unit, a press-button signal input unit and a central processing unit (CPU) 18, wherein the CPU 18 mainly has the functions for converting a press-button input signal into a pulse signal, converting the pulse signal into a signal for controlling the machine tool, and selecting a circuit, and the function of other kinds of auxiliary operation. When a rotation signal generation unit outputs a pulse and the press-button unit does not output a pulse, a selection circuit outputs the pulse generated by the rotation unit; when the press-button unit outputs a pulse and the rotation unit does not output a pulse, the selection circuit outputs the pulse generated by the press-button unit; when the rotation unit outputs a pulse, press-buttons are ineffective after being pressed; when the press-button generation unit outputs a pulse, the rotation pulse unit is ineffective after being swung; and when both of the rotation unit and the press-button unit output pulses or do not output pulses, the manual pulse generator does not output a pulse with control by the selection circuit.

Figure 6:
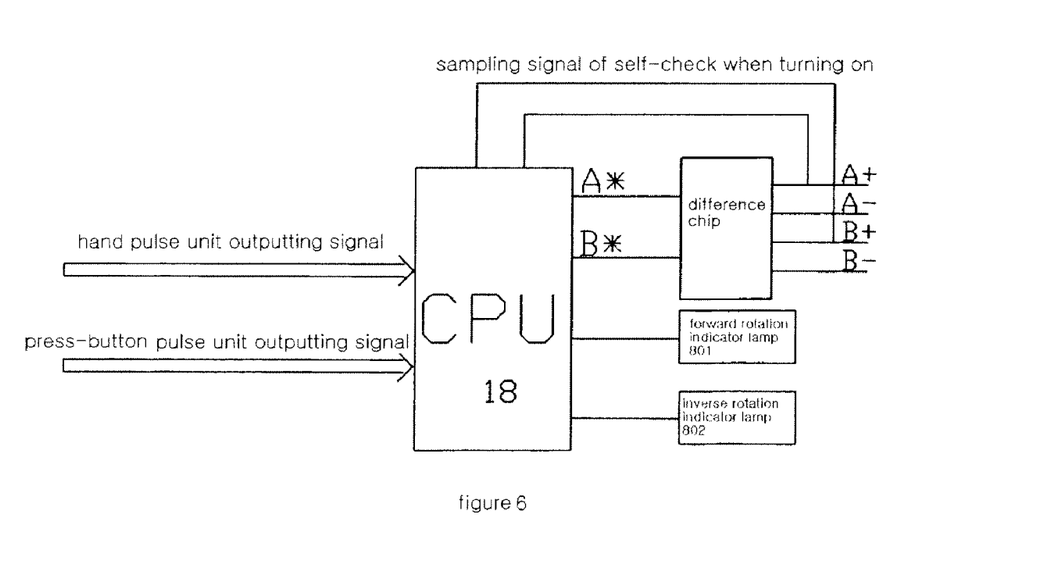
FIG. 6 the schematic circuit diagram of the rotation and press-button dual-way manual pulse generator.
Figure 8:
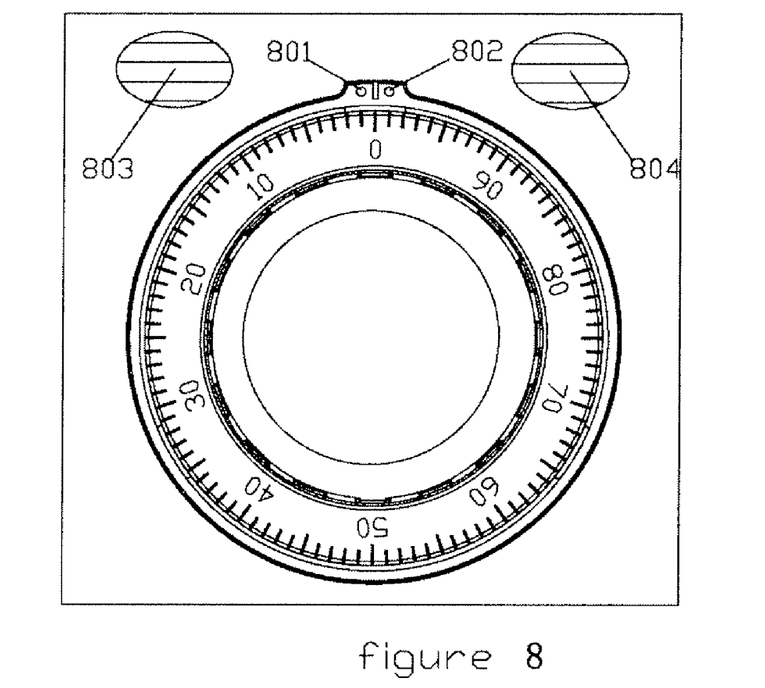
FIG. 8 the panel structural representation of the rotation and press-button dual-way manual pulse generator of the present invention.

As shown in FIG. 6, the signals output by the rotation signal input unit and the press-button signal input unit are transmitted to the CPU, and the CPU 18 outputs control signals for realizing the movement or the positioning of a cutter or a workpiece on the machine tool by the difference chip. As shown in FIG. 8, the pulse generator of the present invention comprises the rotation unit and the press-button unit in mechanical structure, wherein the press-button unit comprises a forward rotation press-button 803 and an inverse rotation press-button 804, and thus CPU 18 is also connected with the forward rotation indicator lamp 801 and the inverse rotation indicator lamp 802 (as shown in FIG. 6). The operation of the press-buttons further has the functions that when the forward rotation press-button 803 is pressed, the pulse generator outputs a forward pulse; when the inverse rotation press-button 804 is pressed, the pulse generator outputs an inverse pulse; and when the forward rotation press-button 803 and the inverse rotation press-button 804 are simultaneously pressed, the pulse generator does not output a pulse. When the press-buttons are pressed for a short time (shorter than 0.5 second), only one pulse is output; when the press-buttons are pressed for 0.5 second to 2 seconds, pulse signals are output with 10 Hz frequency; when the press-buttons are pressed for 2 seconds to 5 seconds, pulse signals are output with 100 Hz frequency; and when the press-buttons are pressed for above 5 seconds, pulse signals are output with 1000 Hz frequency.

The manual pulse generator of the present invention can be operated in two ways that signals are input to the CPU by the rotation signal input unit and the control signals are finally output by the CPU, and that the signals are input to the CPU by the press-buttons and the control signals are finally output by the CPU. The rotation signal input unit inputs signals to the CPU, and the mechanical structure is shown in Example Embodiment 1. The above description is a better specific embodiment for the present invention; however, the protection range of the present invention is not limited to the embodiment, and equal replacement or change should be covered in the protection range of the present invention by any technician familiar with the technical field according to the technical scheme and the invention concept of the present invention in the technical range disclosed in the present invention.

The invention claimed is:

1. A manual pulse generator comprising:
   a rotation pulse input unit and
   a CPU (18), wherein the rotation pulse input unit transmits output signals to the CPU (18) where the output signals are processed, and then control signals are output by a difference chip; meanwhile, the CPU (18) is also connected with a feedback circuit for collecting the control signals to realize self-check when turning on; and wherein the CPU (18) is also connected with a forward rotation indicator lamp (801) and an inverse rotation indicator lamp (802).

2. The manual pulse generator of claim 1, wherein the rotation pulse input unit comprises:
   a manual rotation mechanism;
   a signal generation mechanisms; and
   a magnetic brake mechanism:
      wherein the manual rotation mechanism comprises a dial (8) connected with a rotating shaft (5);
      wherein the signal generation mechanism comprises a code disk (3) fixed to and synchronously rotating with the rotating shaft (5), and a photoelectric switch (4) for monitoring the code disk (3); the electrical signals generated by the photoelectric switch (4) are transmitted to the CPU (18);
      wherein the magnetic brake mechanism comprises an iron bowl (9) and an outer ring tooth damping fin (12) connected to and synchronously rotating with the dial (8), and fixed inner ring tooth damping fins (11) arranged in the mode of concentricity with the outer ring tooth damping fins (12);
      wherein the inner ring tooth damping fins (11) and the outer ring tooth damping fins (12) are respectively provided with teeth (111,112) with middle intervals, mutually corresponding tooth shapes and the same tooth number on the outer circle and the inner circle;
      wherein the inner ring tooth damping fins (11) are attached to one side of an annular magnet (10), and the other side of the annular magnet (10) is connected with the outer ring tooth damping fins (12) by the iron bowl (9); and
      wherein the inner ring tooth damping fins (11) and the outer ring tooth damping fins (12) are both made from permeablility magnetic materials, magnetic poles N and S are respectively formed on the teeth of the inner ring tooth damping fins (11) and the outer ring tooth damping fins (12), and the polarities of the magnetic poles formed on the adjacent positions of the teeth (111,112) are opposite.

3. The manual pulse generator of claim 2, wherein the inner ring tooth damping fins (11) and the outer ring tooth damping fins (12) are both formed by stacking a number of damping fins.

4. The manual pulse generator of claim 2, wherein the forward rotation indicator lamp (801) and the inverse rotation indicator lamp (802) are arranged on a fixed seat (14).

5. The manual pulse generator of claim 1, wherein the forward rotation indicator lamp (801) and the inverse rotation indicator lamp (802) are arranged on a fixed seat (14).

6. A manual pulse generator comprising:
   a rotation pulse input unit;
   a CPU (18); and
   a press-button signal input unit, wherein the rotation pulse input unit and the press-button signal input unit transmit output signals to the CPU (18) where the output signals are processed, and then control signals are output by a difference chip; meanwhile, the CPU (18) is also connected with a feedback circuit for collecting the control signals to realize self-check when turning on; and wherein the CPU (18) is also connected with a forward rotation indicator lamp (801) and an inverse rotation indicator lamp (802).

7. The manual pulse generator of claim 6, wherein the rotation pulse input unit comprises:
   a manual rotation mechanism;
   a signal generation mechanisms; and
   a magnetic brake mechanism:
      wherein the manual rotation mechanism comprises a dial (8) connected with a rotating shaft (5);
      wherein the signal generation mechanism comprises a code disk (3) fixed to and synchronously rotating with the rotating shaft (5), and a photoelectric switch (4) for monitoring the code disk (3); the electrical signals generated by the photoelectric switch (4) are transmitted to the CPU (18);
      wherein the magnetic brake mechanism comprises an iron bowl (9) and an outer ring tooth damping fin (12) connected to and synchronously rotating with the dial (8), and fixed inner ring tooth damping fins (11) arranged in the mode of concentricity with the outer ring tooth damping fins (12);
      wherein the inner ring tooth damping fins (11) and the outer ring tooth damping fins (12) are respectively provided with the teeth (111,112) with middle intervals, mutually corresponding tooth shapes and the same tooth number on the outer circle and the inner circle;

wherein the inner ring tooth damping fins (11) are attached to one side of the annular magnet (10), and the other side of the annular magnet (10) is connected with the outer ring tooth damping fins (12) by the iron bowl (9); and wherein the inner ring tooth damping fins (11) and the outer ring tooth damping fins (12) are both made from permeablility magnetic materials, magnetic poles N and S are respectively formed on the teeth of the inner ring tooth damping fins (11) and the outer ring tooth damping fins (12), and the polarities of the magnetic poles formed on the adjacent positions of the teeth (111,112) are opposite.

8. The manual pulse generator of claim 7, wherein the inner ring tooth damping fins (11) and the outer ring tooth damping fins (12) are both formed by stacking a number of damping fins.

9. The manual pulse generator of claim 6, wherein the forward rotation indicator lamp (801) and the inverse rotation indicator lamp (802) are arranged on a fixed seat (14).

10. An operation method for a manual pulse generator comprising a rotation signal input unit and a CPU (18), wherein the method comprises the steps of:

inputting signals to the CPU (18) by the rotation signal input unit;

outputting control signals by the CPU (18), wherein the CPU (18) is connected with a feedback circuit, and the CPU (18) is also connected with a forward rotation indicator lamp (801) and an inverse rotation indicator lamp (802);

collecting control signals back to the CPU (18) via the feedback circuit to realize a self-check operation when turning on.

11. The operation method for a manual pulse generator of claim 10, wherein the manual pulse generator further comprises a press-button signal input unit and wherein the inputting step further comprises:

inputting signals to the CPU (18) by one or more press-buttons in the press-button unit.

12. The operation method for a manual pulse generator of claim 11, wherein the signals to the CPU (18) by the one or more press-buttons are converted into one or more pulse signals.

13. The operation method for a manual pulse generator of claim 12, wherein one pulse is generated when the one or more press-buttons are pressed for shorter than 0.5 second; a pulse signal output with 10 Hz frequency is generated in the CPU (18) when the one or more press-buttons are pressed for 0.5 second to 2 seconds; a pulse signal output with 100 Hz frequency is generated in the CPU (18) when the one or more press-buttons are pressed for 2 seconds to 5 seconds; and a pulse signal output with 1000 Hz frequency is generated in the CPU (18) when the one or more press-buttons are pressed for longer than 5 seconds.

14. The operation method for a manual pulse generator of claim 12, wherein the one or more pulse signals are converted by CPU (18) into control signals for controlling a machine tool.

15. The operation method for a manual pulse generator of claim 10, and wherein the CPU (18) turns on the forward rotation indicator lamp or the inverse rotation indicator lamp for indicating the forward rotation condition or the inverse rotation condition of a motor under the condition of control signal output.

16. The operation method for a manual pulse generator of claim 10, wherein the control signals are output by a difference chip operatively connected to the CPU (18).

17. The operation method for a manual pulse generator of claim 10, wherein the forward rotation indicator lamp (801) and the inverse rotation indicator lamp (802) are arranged on a fixed seat (14).

18. The operation method for a manual pulse generator of claim 10, wherein the rotation pulse input unit comprises:

a manual rotation mechanism;

a signal generation mechanism; and a magnetic brake mechanism:

wherein the manual rotation mechanism comprises a dial (8) connected with a rotating shaft (5);

wherein the signal generation mechanism comprises a code disk (3) fixed to and synchronously rotating with the rotating shaft (5), and a photoelectric switch (4) for monitoring the code disk (3); the electrical signals generated by the photoelectric switch (4) are transmitted to the CPU (18);

wherein the magnetic brake mechanism comprises an iron bowl (9) and an outer ring tooth damping fin (12) connected to and synchronously rotating with the dial (8), and fixed inner ring tooth damping fins (11) arranged in the mode of concentricity with the outer ring tooth damping fins (12);

wherein the inner ring tooth damping fins (11) and the outer ring tooth damping fins (12) are respectively provided with the teeth (111,112) with middle intervals, mutually corresponding tooth shapes and the same tooth number on the outer circle and the inner circle;

wherein the inner ring tooth damping fins (11) are attached to one side of the annular magnet (10), and the other side of the annular magnet (10) is connected with the outer ring tooth damping fins (12) by the iron bowl (9); and wherein the inner ring tooth damping fins (11) and the outer ring tooth damping fins (12) are both made from permeablility magnetic materials, magnetic poles N and S are respectively formed on the teeth of the inner ring tooth damping fins (11) and the outer ring tooth damping fins (12), and the polarities of the magnetic poles formed on the adjacent positions of the teeth (111,112) are opposite.

* * * * *